Jan. 24, 1928.
W. BROWN
1,657,063
METHOD OF FORMING CUTTING TOOLS
Filed Nov. 13, 1922    3 Sheets-Sheet 1
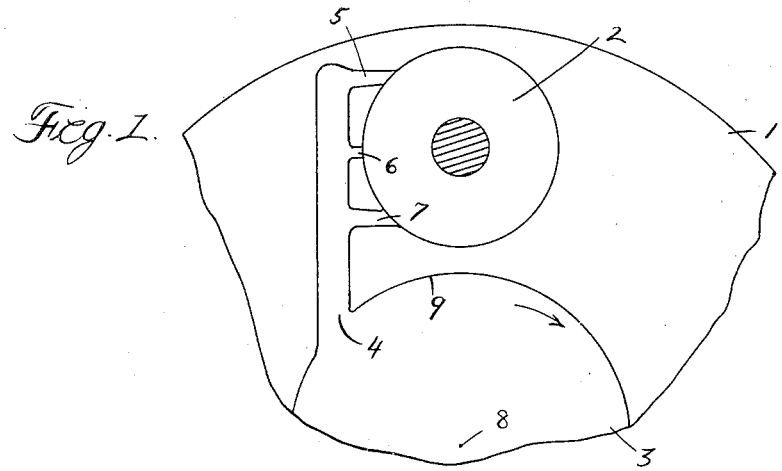
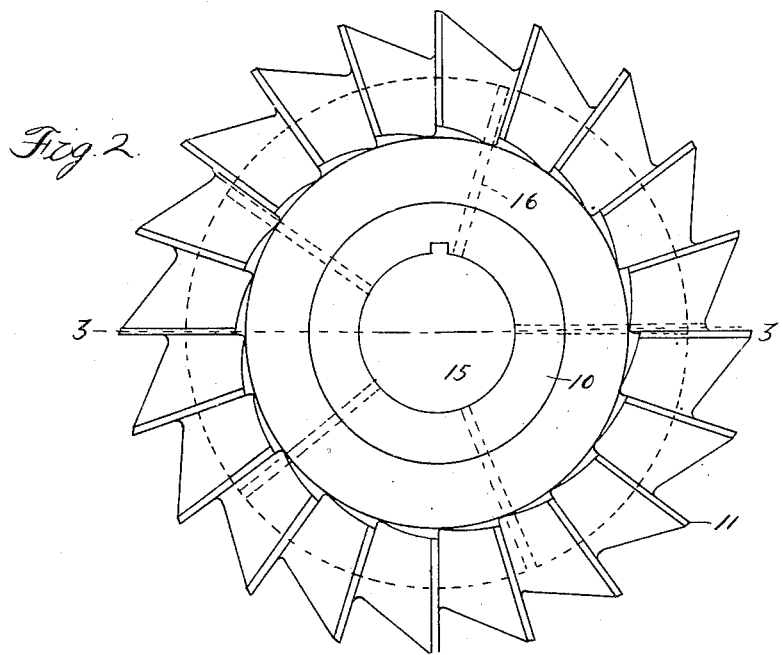
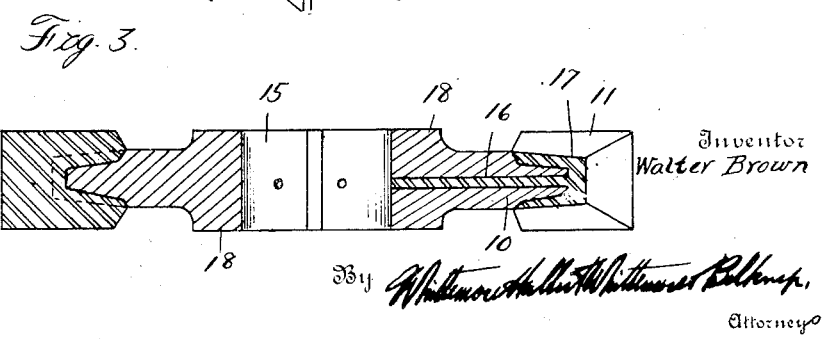
Inventor
Walter Brown Jan. 24, 1928.
W. BROWN
1,657,063
METHOD OF FORMING CUTTING TOOLS
Filed Nov. 13, 1922
3 Sheets-Sheet 2
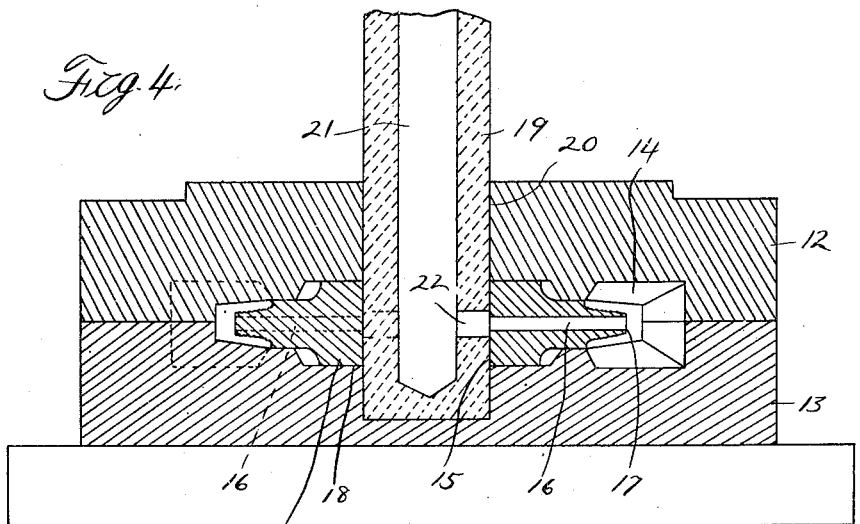
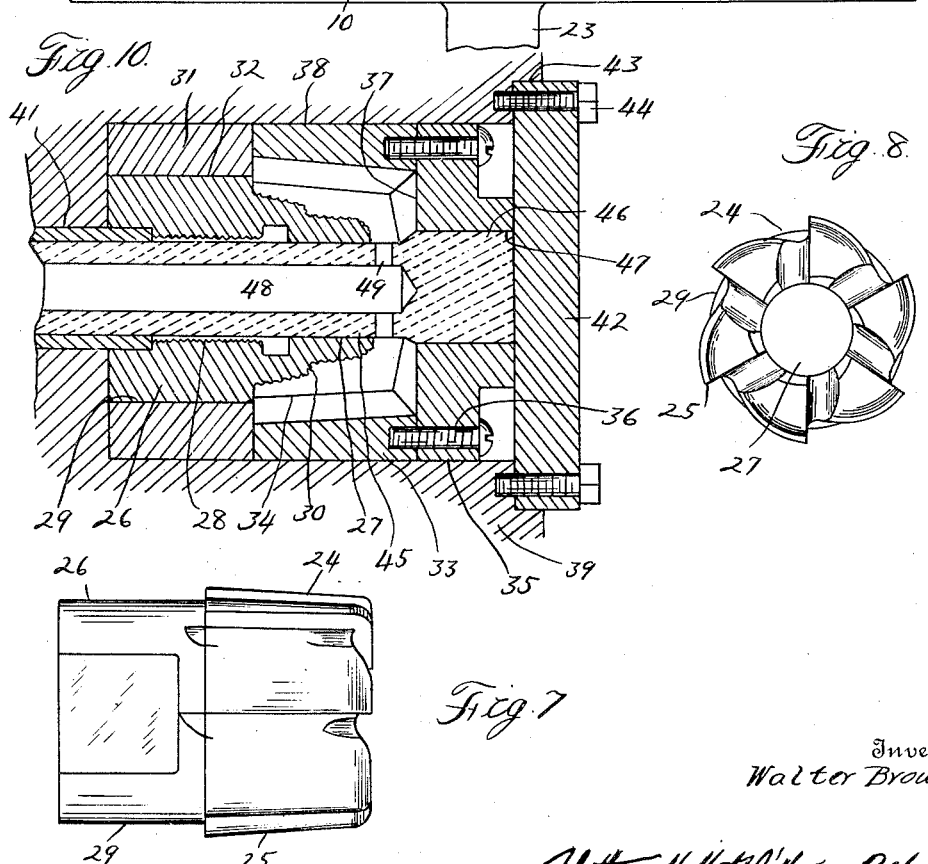
Inventor
Walter Brown
Attorneys Jan. 24, 1928.  
W. BROWN  
1,657,063  
METHOD OF FORMING CUTTING TOOLS  
Filed Nov. 13, 1922  
3 Sheets-Sheet 3
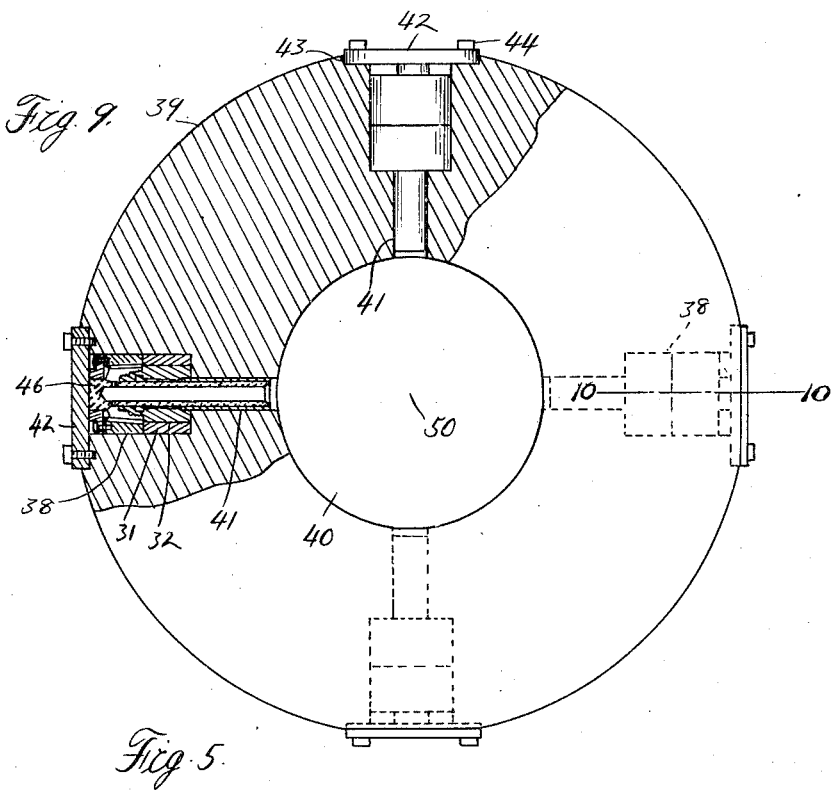
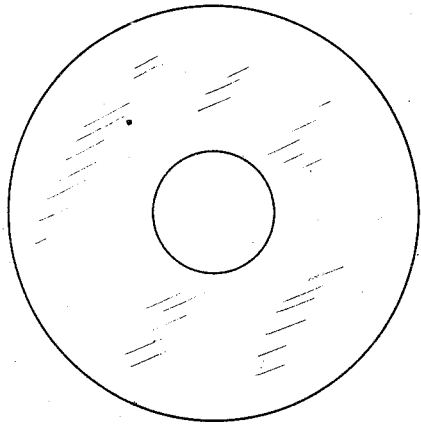
Inventor  
Walter Brown  
Attorneys Patented Jan. 24, 1928.

1,657,063

UNITED STATES PATENT OFFICE.

WALTER BROWN, OF TOLEDO, OHIO.

METHOD OF FORMING CUTTING TOOLS.

Application filed November 13, 1922. Serial No. 600,493.

The invention relates to cutting tools and the method for forming the same from a high fusing non-ferrous alloy.

In the present state of the art it is known that certain types of non-ferrous alloys are adapted for cutting tools and are capable of withstanding high speeds and heavy cuts, but, while the advantages of this type of material have been known and utilized for certain kinds of tools, the inherent brittleness and the unmachinable nature of the alloy has prevented its use except in a very limited field. The general type of non-ferrous alloy which has been most successfully used contains as the basic elements cobalt, chromium, tungsten, and other high fusing metals. This material can be manufactured into bars, which can be used as tool bits, cutter blades, etc., when suitably supported by a member of steel or other stronger metal. However, for many machining operations it is necessary to have fashioned tools of intricate design and up to the present time, the most satisfactory material for these cutters has been high speed steel which can be forged into a blank of the required size and thereafter machined while in the annealed state to form the general contour of the tool. This process, however, is expensive for it requires complicated machining operations when used for manufacturing such tools as milling cutters, end mills, etc.

One of the objects of my invention is to obtain a method for the manufacture of fashioned tools of non-ferrous, non-machinable high fusing alloys. Another object is to produce an improved type of alloy which has better cutting qualities than those heretofore used. Still another object is to obtain a cheaper process for manufacturing fashioned cutting tools having cutting qualities superior to any similar tools previously produced.

These and other objects are obtained by a novel method of fabrication which will be more fully described hereinafter.

In the drawings:—

Figure 1 is a plan view of the lower half of a mold for casting circular saw disks;

Figure 2 is a plan view of a milling cutter formed by my improved method;

Figure 3 is a sectional view on the line 3—3 of Figure 2;

Figure 4 is a vertical section of a mold for casting the cutter of Figure 2;

Figure 5 is a plan view of the saw disk formed in the mold shown in Figure 1;

Figure 6 is a section on the line 6—6 of Figure 5;

Figure 7 is a side elevation of a profile cutter;

Figure 8 is a plan view thereof;

Figure 9 is a sectional plan view of a rotary mold for casting the cutter shown in Figures 7 and 8;

Figure 10 is a transverse section on the line 10—10 of Figure 9.

The preferred composition of alloy which lends itself readily to my improved method for forming fashioned cutting tools is as follows:—

|  | Per cent. |
|---|---|
| Cobalt | 48 to 52 |
| Tungsten | 12 to 14 |
| Chromium | 30 to 33 |
| Molybdenum | 1½ to 2 |
| Carbon | 2 to 2½ |
| Silicon | ½ to 1½ |

While this is the composition which I shall refer to specifically, I wish it to be clearly understood that my method is applicable to alloys which vary widely from this analysis and I do not wish to limit myself to other than the general type, as defined by the appended claims.

The chief characteristics of this alloy are that it is hard, dense, non-magnetic, non-corrosive, high fusing, non-machinable (that is, not commercially machinable by other processes than grinding), wear resisting, and possesses unusual cutting properties. In addition to these properties the alloy, when manufactured according to the usual processes, is also very brittle, which is exceedingly detrimental to its use in cutting tools, unless it is supported or reinforced by some other material which will increase strength and toughness. When manufactured according to my method, however, it is not always necessary to have a reinforcing material, as I have found that for certain types of fashioned cutting tools, the material will stand up under considerable abuse when wholly constructed of the alloy.

My method does not include the original manufacture of the alloy, which may be made in a variety of ways, such as by melting the virgin materials or by fusing other alloys together to obtain the proper composition. The material once formed is preferably re-melted in a suitable refractory container and the usual process is to first preheat to a temperature of 1600 to 1700 degrees Fahrenheit, then place in a furnace heated to a temperature of 2300 to 2600 degrees F. and after the alloy has reached this temperature, remove it from the furnace and subject it to the heat of an electric arc in order to superheat the molten metal to a temperature best suited for pouring. The electric arc is preferably formed by passing a direct current through two carbon electrodes which are placed in the container, and the electrodes are held by an operator who watches the metal as it is being heated and at the same time continually stirs the molten mass with the carbon electrodes to insure a homogeneous mixture. The stirring of the metal with the carbon electrodes also has the effect of increasing the carbon content of the alloy. While the best temperature for pouring the metal may vary under different conditions, I have found that the most satisfactory results are ordinarly obtained when the alloy is brought to the point where small bubbles rise to the surface, or, in other words, the boiling point of some of the constituents of the mixture.

When the metal has reached this temperature, it is quickly poured into a suitable mold under relatively high pressure, which is preferably obtained by rotating the mold to develop centrifugal force. I have also found that the use of metal molds is advantageous since it causes a chilling effect which, together with increased casting pressure, forms a fine-grained product which is free from blow holes and other casting defects.

For certain classes of castings it has also been found advisable to preheat the mold to a temperature of 800 to 1200 degrees F., the amount of preheating necessary depending upon the size of the casting and the temperature of the molten metal being poured. It is also desirable in most cases to open the mold as soon as the metal has solidified, so that the casting may be removed from the mold while still in a heated condition, preferably red hot, and placed in an annealing furnace or in a heat insulating material, such as powdered mica.

The alloy which has been cast according to the method just described has a clean surface, is dense, hard and free from blow holes, and I have found that castings may be obtained having intricate shapes and be perfectly formed at the corners, which is essential in a cutting tool where the corners perform most of the work.

As an example of a cutting tool produced by my improved method, Figure 1 illustrates a mold for a circular saw disk. 1 is the lower half of a metal mold containing the depression 2 for receiving the molten metal which is poured through the opening 3 in the center of the mold and is distributed to the depression by means of a gate 4 and the sprues 5, 6 and 7. As illustrated, the mold rotates clockwise about the center 8 and the gate 4 extends outwardly from the center in a direction substantially parallel to a radial line. By this form of gating the centrifugal action during the rotation of the mold causes the metal to hug the outer wall 9 and enter first the sprue 5. As more metal is poured the depression 2 will be filled progressively inward until the entire space is filled.

There are a number of different types of molds which may be used in forming cutting tools by this method, but having described one which is adapted for forming a simple cutter composed entirely of the non-ferrous alloy, I will now describe the method of forming larger and more intricate shapes. Figure 2 shows a milling cutter which contains a hub portion 10 formed of steel or other suitable material, around which has been cast the cutting portion 11 in such a manner as to form an interlocking engagement of the two portions of the tool. The mold used in producing this cutter consists essentially of upper and lower sections 12 and 13, respectively, containing the mold cavity 14 into which is inserted the steel center 10. This center 10 is provided with a central bore 15 from which the bores 16 extend radially outward to the periphery 17. The cross section of the member 10 is tapered at the periphery, while at the center of the member the bosses 18 form a hub portion. In order to introduce the molten metal into the mold, a refractory bushing 19 is inserted through the aperture 20 in the upper section 12 of the mold and the lower part of the bushing extends into the bore 15 of the member 10. The bushing is provided with a longitudinal bore 21 and the radial bores 22, which are so arranged as to be aligned with the radial bores 16 in the member 10. The mold is placed upon a suitable spindle 23, the axis of which is concentric with the axis of the mold and the member 10, and suitable means (not shown) is provided for rotating the mold, for example, at the rate of 600 revolutions per minute. The molten metal is poured through the bushing 19 and the centrifugal action causes it to quickly flow through the radial bores in the bushing and the member 10, thereby filling the cavity 14 and solidifying about the member 10.

It will be understood that the mold may be preheated as previously described and that the alloy to be cast is superheated to the proper temperature, depending upon size of the section to be cast.

Another method for forming cutting tools is shown in Figure 10 which illustrates a suitable mold for casting end mills. As an example of the latter Figure 7 is an end mill 24 comprising the cutting portion 25 and the shank portion 26. The shank portion 26 is made of steel or other machinable metal and is provided with a longitudinal bore 27, which extends therethrough, which is threaded at 28 to engage the spindle of the machine on which it is intended to operate. The rear end of the shank portion 26 comprises the cylindrical surface 29 while the tapered surface 30 is roughened in order to form an interlocking engagement with the cast metal cutting portion.

The mold is built up of a number of different sections and consists of the cylindrical ring 31, the inner surface 32 of which is of the same diameter as the cylindrical portion 29 of the shank and forms a support for the latter. The mold cavity is formed by a body portion 33, which is in the form of a cylindrical ring and the inner surface 34 is made complementary to the shape of the cutter to be cast. The end of the mold is a hollow cylindrical disk 35 which is secured to the body portion 33 by the screws 36. The inner surface 37 of the end portion 35 is shaped complementary to the end of the cutter to be cast.

In order to supply the necessary casting pressure, the mold is placed in a radial bore 38 of a rotatable mold 39 which is provided with a central opening 40 connecting with the radial bore 38 by means of a passageway 41. Preferably the mold 39 is provided with a series of radial bores 38 which are symmetrically arranged around the periphery and in this manner a number of castings may be formed in a single operation. A disk 42 is placed in a counterbore 43 to hold the mold end 39 in position and the disk is suitably secured to the mold 39 by means of the bolts 44. In order to introduce a molten metal into the mold cavity a refractory bushing 45 is arranged radially of the mold 39 and the end 46 of the bushing is seated in an aperture 47 of the mold end 35. The bushing, which is preferably made of graphite, contains a longitudinal bore 48 and the radially extending bores 49 which communicate with the mold cavity.

The mold 39 is rotated about its center 50 to provide the necessary centrifugal force for casting and the molten metal is introduced through the opening 40 and is forced outward by centrifugal action through the passageway 41 and the bushing 45 to the mold cavity where it solidifies in interlocking engagement with the shank portion 26. As soon as the alloy has solidified the casting is removed by opening the mold and it is placed in an annealing furnace to relieve the casting strains, as previously described.

While I have specifically described only three types of fashioned cutting tools it will be obvious that this method may be applied in forming many other cutting tools either made entirely of the alloy or having a reinforcing material in inter-locking engagement therewith.

As previously mentioned, the molds are preferably made of metal and while I am not limited to any particular type of metal, I have found that gray cast iron is a suitable material since it stands up well under casting conditions and is also easily machined. It is also found desirable to coat the mold with some sort of a refractory material such as graphite to prevent the castings from sticking to the mold but when so treated there is very little trouble occasioned in removing the castings.

What I claim as my invention is:—

1. The method of forming articles from a high fusing non-ferrous alloy comprising the melting of the alloy, super-heating the molten metal and casting the super-heated material in a mold under relatively high pressure.

2. The method of forming articles from a high fusing non-ferrous alloy comprising the melting of the alloy, super-heating the molten metal and centrifugally casting the super-heated material in a mold.

3. The method of forming articles from a high fusing non-ferrous alloy comprising the melting of the alloy, super-heating the molten metal and casting the super-heated material in a preheated mold under relatively high pressure.

4. The method of forming articles from a high fusing non-ferrous alloy comprising the melting of the alloy, super-heating the molten metal and casting the super-heated material in a preheated metal mold under relatively high pressure.

5. The method of forming articles from a high fusing non-ferrous alloy comprising the melting of the alloy, super-heating the molten metal and centrifugally casting the super-heated material in a preheated metal mold.

6. The method of forming cutting tools comprising the melting of a non-ferrous alloy having cutting properties, superheating the molten alloy, casting the superheated metal in a preheated metal mold to form an interlocking engagement with a member contained in said mold.

7. The method of forming cutting tools comprising the melting of a non-ferrous alloy, preheating a metal mold containing a member, and centrifugally casting said molten metal in said preheated mold to form an interlocking engagement with said member.

8. The method of forming cutting tools comprising the introduction of a machinable member into a metal mold, preheating the mold and member and casting a non-machinable cutting material in said preheated mold to form an interlocking engagement with said machinable member and to form cutting teeth of the casting material.

9. The method of forming cutting tools comprising the introduction into a metal mold of a machinable member, preheating said mold and said member, rotating said preheated mold and pouring a super-heated molten alloy into said rotating mold to centrifugally cast the alloy in inter-locking engagement with said machinable member and to form a general contour of the cutting tool.

In testimony whereof I affix my signature.

WALTER BROWN.